US008999870B2

(12) United States Patent
Goedeke et al.

(10) Patent No.: US 8,999,870 B2
(45) Date of Patent: Apr. 7, 2015

(54) BARIUM- AND STRONTIUM-FREE VITREOUS OR GLASS-CERAMIC JOINTING MATERIAL AND ITS USE

(71) Applicant: Schott AG, Mainz (DE)

(72) Inventors: Dieter Goedeke, Bad-Soden (DE); Jens Suffner, Landshut (DE)

(73) Assignee: Schott AG, Mainz (DE)

( * ) Notice: Subject to any disclaimer, the term of this patent is extended or adjusted under 35 U.S.C. 154(b) by 20 days.

(21) Appl. No.: 13/851,354

(22) Filed: Mar. 27, 2013

(65) Prior Publication Data

US 2013/0272774 A1 Oct. 17, 2013

(30) Foreign Application Priority Data

Apr. 17, 2012 (DE) .......................... 10 2012 206 266

(51) Int. Cl.
| | |
|---|---|
| *C03C 10/00* | (2006.01) |
| *C03C 3/087* | (2006.01) |
| *C03C 8/24* | (2006.01) |
| *C03C 3/089* | (2006.01) |
| *C03C 3/095* | (2006.01) |
| *C03C 27/02* | (2006.01) |
| *C04B 37/04* | (2006.01) |
| *C25B 9/00* | (2006.01) |
| *H01M 8/02* | (2006.01) |
| *C04B 37/00* | (2006.01) |
| *C04B 37/02* | (2006.01) |

(52) U.S. Cl.
CPC ............... *C03C 8/24* (2013.01); *Y10T 403/213* (2013.01); *Y02E 60/50* (2013.01); *C03C 3/089* (2013.01); *C03C 3/095* (2013.01); *C03C 10/00* (2013.01); *C03C 27/02* (2013.01); *C04B 37/04* (2013.01); *C25B 9/00* (2013.01); *H01M 8/0217* (2013.01); *C04B 37/003* (2013.01); *C04B 37/023* (2013.01); *C04B 2237/10* (2013.01); *C04B 2237/343* (2013.01); *C04B 2237/348* (2013.01)

(58) Field of Classification Search
CPC .. C03C 10/0045; C03C 10/0009; C03C 8/02; C03C 8/14; C03C 8/24; C03C 8/25; C03C 3/087
USPC ........................................ 501/2, 5, 14, 15, 70
See application file for complete search history.

(56) References Cited

U.S. PATENT DOCUMENTS

| | | | |
|---|---|---|---|
| 4,199,704 A | | 4/1980 | Varshneya et al. |
| 4,783,429 A | * | 11/1988 | Shibuya et al. ................... 501/5 |
| 6,124,224 A | * | 9/2000 | Sridharan et al. ............... 501/15 |
| 6,532,769 B1 | | 3/2003 | Meinhardt et al. |
| 7,214,441 B2 | | 5/2007 | Cortright et al. |
| 7,378,361 B2 | | 5/2008 | Pinckney et al. |
| 7,399,720 B1 | | 7/2008 | Brow et al. |
| 8,163,436 B2 | | 4/2012 | Larsen et al. |
| 2008/0131739 A1 | * | 6/2008 | Badding et al. ................. 429/13 |
| 2010/0129726 A1 | * | 5/2010 | Tanida et al. ................. 429/479 |
| 2012/0193223 A1 | | 8/2012 | Nielsen et al. |
| 2012/0316052 A1 | | 12/2012 | Akamatsu et al. |

FOREIGN PATENT DOCUMENTS

| | | |
|---|---|---|
| CN | 101421199 | 4/2009 |
| DE | 43 34 438 | 4/1995 |
| DE | 198 57 057 | 4/2000 |
| DE | 10 2005 002 435 | 7/2006 |
| DE | 600 25 364 | 8/2006 |
| EP | 2 109 173 | 10/2009 |
| EP | 2 228 858 | 9/2010 |
| JP | 2008-516881 | 5/2008 |
| WO | WO2009/017173 | 2/2009 |
| WO | 2011/042148 | 4/2011 |
| WO | 2011/105519 | 9/2011 |

OTHER PUBLICATIONS

Zhenguo Yang et al: "Chemical Interactions of Barium-Calcium . . . " Solid State Ionics 160, 2003, pp. 213-225 (in English).

* cited by examiner

*Primary Examiner* — Noah Wiese
(74) *Attorney, Agent, or Firm* — Michael J. Striker

(57) ABSTRACT

A vitreous or glass-ceramic jointing material, which has a coefficient of thermal expansion $\alpha_{(20\text{-}750)}$ of $\geq 7 \cdot 10^{-6} \, K^{-1}$ and is free of BaO and SrO except for at the most impurities and is suitable for producing joint connections between chromium-containing alloys or chromium-containing steels.

17 Claims, No Drawings

BARIUM- AND STRONTIUM-FREE VITREOUS OR GLASS-CERAMIC JOINTING MATERIAL AND ITS USE

CROSS-REFERENCE

The subject matter described and claimed herein below is also described in German Patent Application No. 10 2012 206 266.1, filed on Apr. 17, 2012 in Germany. This German Patent Application provides the basis for a claim of priority of invention for the invention described and claimed herein below under 35 U.S.C. 119 (a)-(d).

BACKGROUND OF THE INVENTION

The present invention relates to barium- and strontium-free jointing materials which, in particular, are suitable for sealing high-temperature fuel cells or electrolysis cells, and uses thereof.

For the purposes of the invention, jointing materials are materials which, starting from a glass material, can be present predominantly in amorphous, partially crystalline and/or crystalline form. These are therefore referred to as vitreous or glass-ceramic jointing material for the purposes of the invention. These jointing materials can be used as glass solders, but also in the form of preforms, etc.

Vitreous or glass-ceramic jointing materials are usually used for producing joint connections, in particular, in order to join glass and/or ceramic components to one another or to components composed of metal in an electrically insulating manner. In the development of jointing materials based on glass, their composition is often selected so that the coefficient of thermal expansion of the jointing materials corresponds approximately to that of the components to be joined to one another in order to obtain a lastingly stable joint connection. Compared to other joint connections, for example those composed of plastic, jointing materials based on glass have the advantage that they form a hermetic seal and can withstand higher temperatures.

Jointing materials in the form of glass solders are generally often produced from a glass powder which in the joining operation, also known as soldering operation, is melted and together with the components to be joined gives the joint connection under the action of heat. The joining temperature is generally selected so as to correspond approximately to the spherical temperature of the glass. Measurement of the spherical temperature is a standard measurement method known to those skilled in the art and can be carried out using a hot-stage microscope. If a crystallization-free glass in the form of a glass powder is melted as jointing material and cooled again so that it solidifies, it can usually be melted again at the some melting temperature. In the case of a joint connection composed of a jointing material in the amorphous state, this means that the operating temperature to which the joint connection can be subjected to in the long term must not be higher than the joining temperature. In actual fact, the operating temperature in many applications has to be significantly below the joining temperature since the viscosity of the jointing material decreases with increasing temperature and a glass having some flowability can be squeezed out of the joint connection at high temperatures and/or pressures, so that the joint connection can fail in its function. For this reason, jointing materials based on glass for high-temperature applications usually have to have a joining temperature which is significantly above the later operating temperature. This is possible in the case of non-crystallizing jointing materials based on glass, i.e. those which are present as amorphous jointing material before the joining operation, or else by means of at least partially crystalline jointing materials in the case of which the base glass crystallizes at least partially or else completely during the joining operation. For the purposes of the invention, partially or completely crystallized jointing materials are referred to as glass-ceramic jointing materials or glass-ceramic.

For particularly high use temperatures, ceramic materials in the case of which an at least substantially amorphous base glass crystallizes at least partly or else completely during the joining operation are frequently used as jointing material. The crystalline phases or the ceramics generally have properties which are significantly different from those of the amorphous base glass, e.g. in respect of the thermal expansion or the glass transition temperatures, on that the total system composed of amorphous glass phase and crystalline phases can likewise have properties which are different from those of the amorphous base glass alone. In particular, in the case of glass-ceramic jointing materials the temperature required for the melting can be significantly above that for the amorphous base glass. Whether an amorphous glass or a glass-ceramic is formed from an amorphous base glass during the joining operation depends, in the case of a suitable composition of the base glass, firstly on the way in which the joining operation is carried out, in particular on the heating and cooling curves. The term vitreous or glass-ceramic jointing material therefore encompasses, for the purposes of the present invention, both the base glass and also the system formed therefrom after use, depending on whether it is amorphous, partially crystalline and/or crystallizes completely.

One field of use of jointing materials having a high melting temperature is, for example, joint connections in high-temperature fuel cells which can be used, for example, as energy source in motor vehicles or for decentralized energy supply. An important fuel cell type is, for example, the solid oxide fuel cell (SOFC) which can have very high operating temperatures of up to about 1100° C. The joint connection with the jointing material is usually used for producing fuel cell stacks, i.e. for joining a plurality of individual fuel cells to form a stack. Such fuel cells are already known and are continuously being improved. In particular, the trend in present-day fuel cell development is generally towards lower operating temperatures. Some fuel cells reach their operating temperatures below 800° C., so that lowering of the joining temperatures is possible and also desirable because of the lower thermal stress on the SOFC components during the joining operation.

Electrolysis cells have a structure similar to that of fuel cells, especially solid oxide electrolysis cells (SOECs) which can be used for preparing chemical elements and/or compounds and can play a role in, for example, the storage and/or conversion of energy produced on a renewable basis. These are likewise a preferred field of use of the jointing materials of the invention.

A further field of use of the jointing materials described here are any components, e.g. sensors and/or actuators, which are subjected to high temperatures. Examples of uses are in the exhaust gas train of an energy generation unit or in the combustion chamber itself. The energy generation unit can be, for example, an internal combustion engine, an aircraft turbine, a gas turbine, etc. The jointing materials are in these cases often used in the housing of these sensors and/or actuators, for example in order to join housing parts to one another or realize electric leads passing through the housing. In these applications, operating temperatures of more than 800° C., even more than 1000° C., are often exceeded. Applications in the field of solar energy generation, e.g. in solar furnaces, or for lead-throughs in particularly critical fields, e.g. nuclear power stations, fusion power stations, etc., are likewise possible.

Even higher operating temperatures of above 1000° C. are required in the case of components in which individual components made of ceramic have to be joined.

The possible operating temperature of vitreous or glass-ceramic jointing materials, and also their chemical properties associated therewith and their coefficient of thermal expansion, are important criteria which qualify the jointing materials for the intended applications. The chemical properties of the jointing material should be compatible with the material which is joined by the jointing material, in particular the operating temperature, and likewise with the surroundings. For example, vitreous or glass-ceramic jointing materials should often be so chemically resistant that they can withstand the materials and/or mixtures used or formed in the fuel cells or electrolysis units and also further reaction products in the long term.

Vitreous or glass-ceramic jointing materials per se are known from numerous publications. However, few are suitable for high-temperature applications.

DE 600 25 364 T2 describes a glass-ceramic composite which consists of the system BaO—SrO—CaO—MgO—$Al_2O_3$—$SiO_2$. Glass-ceramic compositions comprising at least 20 mol % of BaO and up to 20 mol % of $B_2O_3$ are disclosed.

DE 10 2005 002 435 A1 relates to glass-ceramics as jointing material for high-temperature applications. The material system likewise allows significant amounts of BaO and contains at least 15% by weight of $B_2O_3$. No information is given regarding the physical properties.

U.S. Pat. No. 6,532,769 B1 describes a join comprising a glass containing at least 20 mol % of BaO.

All these glasses and glass-ceramics can contain appreciable amounts of BaO. BaO is used in the art as constituent of such materials in order to set the desired high coefficient of thermal expansion. Apart from the glass former $SiO_2$, BaO is thus a main component of the glass or the glass-ceramic. However, all these glasses containing barium oxide suffer from the disadvantage that they undergo interfacial reactions with chromium and thus have only a low utility and poor adhesion to chromium-containing materials. Their thermal cyclability is likewise adversely affected thereby. As a result, joint connections comprising materials having a large chromium content, e.g. chromium steels and chromium-nickel steels, and these glasses are unstable, i.e. the glass layer easily flakes off the materials having a high chromium content.

Barium-free glass solders are known from U.S. Pat. No. 7,214,441 B2. Instead of BaO, the description provides for SrO in amounts of from ≥10 to 25 mol %. The examples have a minimum SrO content of 18 mol % or the only examples which do not contain SrO have $B_2O_3$ as glass former in large amounts of more than 40 mol %. High contents of $B_2O_3$ significantly decrease the chemical resistance of the glasses, so that they cannot be used in the long term in the environments typical for high-temperature applications, in which aggressive media and/or aggressive substances usually occur. In addition, a poor chemical resistance in contact with chromium-containing alloys is also observed as a result of the high content of SrO.

It has been found that joint connections which are stable in the long term cannot be produced using these and the SrO-containing variants.

SUMMARY OF THE INVENTION

It is therefore an object of the invention to provide a vitreous or glass-ceramic jointing material which is free of barium and strontium and has a linear coefficient of thermal expansion $\alpha_{(20-750)}$ in the temperature range from 20° C. to 750° C. of at least $7 \cdot 10^{-6}$ $K^{-1}$, so that joint connections which are stable in the long term can be produced between chromium-containing materials such as chromium-containing steels or chromium alloys and the jointing material. It is likewise an object of the invention to provide joint connections comprising the jointing material of the invention and also uses of the jointing material of the invention.

These objects, and others which will be made more apparent hereinafter, are achieved by the jointing material, joint connections and/or other uses of the jointing material according to the appended claims. Preferred embodiments are described in the dependent claims.

All percentages indicated in the following are, unless indicated otherwise, in mol % on an oxide basis.

According to the invention, the vitreous or glass-ceramic jointing material is free of BaO and SrO except for at the most impurities. Free except for at the most impurities means that BaO and SrO are not deliberately added to the starting material. However, completely avoiding contamination with these components due to the natural distribution of these materials in the desired components or processing in glass production sometimes cannot be avoided completely or not be justifiable because of the outlay. Small amounts of BaO and SrO can therefore be present in the jointing material of the invention because of these impurities. However, the total content of BaO and SrO preferably does not exceed 0.2 mol %.

The coefficient of thermal expansion $\alpha_{(20-750)}$ of the jointing material of the invention is at least $7 \cdot 10^{-6}$ $K^{-1}$, preferably at least $8 \cdot 10^{-6}$ $K^{-1}$, and preferably not more than $9.5 \cdot 10^{-6}$ $K^{-1}$.

The reason for the problematical behaviour of BaO-containing jointing materials is considered to be that barium chromate phases can form at the interface between the chromium-containing join partner and the jointing material and these can weaken the bond. According to Yang et al. [Solid State Ionics 160 (2003); 213-235], the interfacial reaction

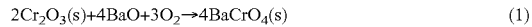

$$2Cr_2O_3(s) + 4BaO + 3O_2 \rightarrow 4BaCrO_4(s) \quad (1)$$

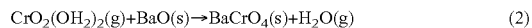

$$CrO_2(OH_2)_2(g) + BaO(s) \rightarrow BaCrO_4(s) + H_2O(g) \quad (2)$$

occurs.

Reaction (1) occurs by diffusion at the interface, while in reaction (2) gaseous chromium oxide reacts with the BaO.

The reaction products during operation of a fuel cell, including water vapour, can cause large pores at the interface of the chromium-containing material and the jointing material. These pores can be the starting point for damage.

Owing to the different coefficients of thermal expansion on the barium chromate phase and the chromium-containing material, e.g. CFY from Plansee, delamination of the jointing material from the metal surface frequently occurs.

The reaction of the vitreous or glass-ceramic jointing material with the Cr from the chromium-containing material frequently also leads to a yellowish discoloration of the BaO-containing jointing material, which is mainly attributable to the barium chromate ($BaCrO_4$) formed. Owing to the formation of the barium chromate phase, the jointing material becomes greatly depleted in barium, which induces increased crystallization.

The inventors have recognized that, just like BaO, SrO displays undesirable interfacial reactions on contact with materials having a high chromium content, which can lead to undesirable interfacial phases. The strontium chromate formed likewise has a coefficient of thermal expansion which is very different from that of the vitreous or glass-ceramic jointing material, due to which unstable joint connections can result because of the mechanisms described. The joint materials of the invention are therefore likewise free of CrO except for at the most impurities.

The vitreous or glass-ceramic jointing materials of the invention contain from 15% to 45% of CaO. It has been found that jointing materials which contain CaO and are free of BaO do not tend to form chromate phases. It is presumed that the diffusion of chromate into the jointing materials of the invention is suppressed. As a result of no phase transformation of the jointing material of the invention thus taking place, the thermal expansion curve (i.e. the depiction of the value of the thermal expansion versus temperature) also displays no discontinuities and/or step changes, so that a particularly stable bond is achieved. The amount of CaO present is in the range from >15% to 45%, from 15.5% to 45%, from 16% to 45%, from 17% to 45% or from 15% to 40%, in particular for the embodiment of the jointing material which crystallizes at least partially.

MgO is optional in the jointing material of the invention and is present in an amount of less than 30%. MgO contributes to controlling the crystallization properties of the jointing material. A further positive effect is that the dielectric loss can be reduced by means of MgO-containing jointing materials. Furthermore, the melting point and the glass transition temperature can be reduced. The content of MgO also increases the coefficient of thermal expansion and thus provides a simple way of matching the jointing material to the component to be joined. This effect is based on the fact that the addition of MgO can bring about the crystallization of enstatite ($MgSiO_3$) and/or $Mg_2SiO_4$ which is known as crystal phase having a high thermal expansion ($\alpha_{(20-300)}$=8.9 to $11 \cdot 10^{-6}$ $K^{-1}$). MgO likewise decreases the glass transition temperature Tg. In connection with CaO, the high-expansion crystal phases $CaMgSi_2O_6$ and/or $Ca_3MgSi_2O_8$ can be formed.

However, small amounts of $Al_2O_3$ can be present in the jointing material of the invention, namely from 0% to 13%. Higher contents can likewise lead to undesirably low values of $\alpha_{(20-750)}$ and greatly increase the viscosity of the jointing material.

The proportion of $B_2O_3$ is, according to the invention, from 0.1% to 14%. This content ensures a sufficiently wide processing window for melting of the jointing material. Low contents of boron are required for the jointing material to wet the substrate at high temperatures before it crystallizes. However, the upper limit should not be exceeded since otherwise the chemical resistance of the jointing material would be reduced. Furthermore, in the case of jointing materials having high boron concentrations, boron can evaporate both during production of the jointing material from the glass melt and/or during melting for the joining process and/or during operation of the component joined by means of the jointing material. It can in this case not be ruled out that the material will gradually change over time and that volatile boron will exercise an adverse influence on operation, e.g. of the fuel cell or electrolysis cell. Within the limits described, the jointing material has a very good chemical resistance which also makes it possible for the jointing material to be used, for example, in high-temperature electrolysis units (SOEC).

The jointing material of the invention additionally contains from 34% to 60% of $SiO_2$. At higher contents, $\alpha_{(20-750)}$ can drop to values of less than $7 \cdot 10^{-6} K^{-1}$, while at lower contents the chemical resistance can decrease to an undesirable extent and the crystallization tendency can increase.

Furthermore. $TiO_2$ and/or $ZrO_2$ and/or $SnO_2$ and/or $HfO_2$ are present as optional tetravalent components in the jointing material of the invention, in each case in an amount of up to 10%. These oxides can, in particular, act as nucleating agents for the partial crystallization which is desirable in particular embodiments and bring about an increase in the glass transition temperature Tg. The crystallization temperature, in particular, can be controlled by means of these additives.

Further optional trivalent components are $La_2O_3$ and/or $Y_2O_3$ in an amount of in each case up to 10%. Further optional trivalent components are oxides $R_2O_3$ selected from the group consisting of $Ga_2O_3$, $In_2O_3$ and $Dy_2O_3$ in an amount of up to 10%. The wording "selected from the group consisting of" means that the members of the group are optionally present individually or together in any combination up to the specified upper limit in the jointing material of the invention. These components, too, are able to influence the crystallization behaviour of the jointing material during the joining operation. At the same time, they can increase the glass formation temperature. In addition, an interaction of the tetravalent and trivalent components can be exploited in order to control the crystallization properties. For example, contents of $ZrO_2$ and $Y_2O_3$ can lead to formation of the high-expansion cubic $ZrO_2$ phase (yttrium-stabilized zirconium oxide) during crystallization.

Likewise, the crystallization properties of the jointing materials of the invention can be controlled by interplay of MgO and the trivalent components. In particular, excessive crystallization and precipitation of undesirable crystal phases can be avoided in the partially crystalline jointing materials.

The jointing material of the invention enables preferably maximum values of $\alpha_{(20-750)}$ of up to $11 \cdot 10^{-6}$ $K^{-1}$ to be achieved. The range is preferably up to $9.5 \cdot 10^{-6}$ $K^{-1}$.

The invention provides for the jointing material of the invention to be able to be melted in the vitreous state and, in its function as soldering glass, subsequently being sufficiently vitreous to flow in order to be able to be joined at temperatures in the range from 800° C. to 1000° C. and display rapid crystallization in the subsequent crystallization step, so that a glass-ceramic joining layer having a proportion of crystalline material of more than 50% by volume can be produced.

The invention likewise provides for the jointing material of the invention to be able to be free of $TeO_2$ (except for at the most impurities), because, inter alia, the raw material is considered to pose a health hazard to the human body. This means that $TeO_2$ is preferably present in an amount of less than 0.3% and particularly preferably less than 0.2% in the glass solder according to the invention. It goes without saying that the invention encompasses complete freedom from $TeO_2$.

A jointing material according to the invention preferably contains from 15% to 40% of CaO, likewise preferably from 17% to 40%, particularly preferably from >32% to 45%. Preferred ranges for MgO are from 0% to <10%, particularly preferably from >5% to <10%. Preferred ranges for $Al_2O_3$ are from 2% to 13%, but also from 0% to 2%. Preferred ranges for $B_2O_3$ are from 4% to 14%, but also from 0.1 to 10%. The preferred range for $SiO_2$ is from 34% to 50%. The preferred range for $Y_2O_3$ is from 0.1% to 7% of $Y_2O_3$.

All these preferred and particularly preferred ranges likewise apply to the individual components mentioned and not only to the totality of the particularly preferred and very particularly preferred ranges; any lower limit can be combined with any upper limit and vice versa.

Thus, a preferred variant of the vitreous or glass-ceramic jointing material of the invention provides for the following ranges for the components present: CaO from 17% to 45%. MgO from 0% to <10%, $Al_2O_3$ from 2% to 13%, $B_2O_3$ from 4% to 14%, $SiO_2$ from 34% to 50%, $La_2O_3$ from 0% to 10%, $Y_2O_3$ from 0% to 10%, $TiO_2$ from 0% to 10%, $ZrO_2$ from 0% to 10%, $SnO_2$ from 0% to 10%, $HfO_2$ from 0% to 10% and $R_2O_3$ from 0% to 10%.

A likewise preferred variant of the vitreous or glass-ceramic jointing material of the invention provides for the following ranges for the components present: CaO from 15% to 40%, MgO from 0% to 30%, in particular from 0% to <30%, e.g. from 0% to 29.8% or from 0% to 19.8%, $Al_2O_3$ from 0% to 2%, $B_2O_3$ from 0.1% to 10%, $SiO_2$ from 30% to 60%, $La_2O_3$ from 0% to 10%, $Y_2O_3$ from 0% to 10%, $TiO_2$ from 0% to 10%, $ZrO_2$ from 0% to 10%, $SnO_2$ from 0% to 10%, $HfO_2$ from 0% to 10% and $R_2O_3$ from 0% to 10%.

A preferred embodiment provides for the jointing material of the invention to necessarily contain $Y_2O_3$ in a proportion of from >0% to 10%, preferably from 0.1% to 10%. This component stabilizes the glass network. Network-forming properties which increase Tg are ascribed to the trivalent $Y^{3+}$ cation. The upper limit of 10% should not be exceeded since otherwise flow of the jointing material is hindered excessively. $Y_2O_3$ also suppresses undesirable cordierite crystallization ($Mg_2Al_4Si_5O_{18}$). This crystal phase is undesirable because of its very low thermal expansion $\alpha_{(20-750)}$ in the range from about $0 \cdot 10^{-6}$ to $2 \cdot 10^{-6} K^{-1}$.

The jointing material of the invention is preferably low in alkali metals or their oxides $Li_2O$ and/or $Na_2O$ and/or $K_2O$. Particular preference is given to a total of less than 1 mol % of these alkali metal oxides mentioned being present in the jointing material. The jointing material of the invention is very particularly preferably free of these abovementioned alkali metal oxides except for at most traces. Alkali metals are generally able to exert an adverse influence on the electrical insulation properties. The chemical resistance also decreases with an increasing content of alkali metals.

The jointing material of the invention is preferably low in the oxides $Cs_2O$ and/or $Rb_2O$ and $Fr_2O$. The jointing material of the invention therefore preferably contains a total of less than 5% of $Cs_2O$ and/or $Rb_2O$. This formulation also encompasses contents of the specified compounds of 0%.

Further additives are of course possible and are likewise encompassed by the invention. For the purposes of the invention, the term jointing material encompasses both the amorphous base glass which is used before the joining operation and also the material formed from the base glass during joining, which can, inter alia, be present in vitreous, partially crystallized, ceramic or other form.

The jointing material of the invention is particularly preferably at least very largely free of PbO, i.e. PbO is present in an amount of not more than 0.3%, and the jointing material of the invention is very particularly preferably free of PbO (except for at most traces). The same applies to $Bi_2O_3$, which as individual component is likewise present in a maximum amount of 0.3% and is preferably not present at all in the jointing material.

Furthermore, impurities introduced via raw materials and/or via refining agents such as $As_2O_3$ and/or $Sb_2O_3$ and/or SrCl can be present in amounts of in each case up to 0.2% in the jointing material of the invention.

In an alternative, the jointing material of the invention is present as an amorphous glass after the joining operation. This means that it has essentially no crystalline regions.

In a further alternative, the jointing material of the invention is present as a glass-ceramic, i.e. it is at least partially crystallized, after the joining operation.

Whether the jointing material of the invention is present as amorphous glass or as glass-ceramic can be determined not only by the balance of the components described but also by the temperature conditions during the joining operation. The joining operation involves, compared to glass production by melting of the raw materials, a subsequent thermal treatment. Softening can be shifted to higher temperatures by the crystallization carried out in the subsequent thermal treatment and the jointing material of the invention can be matched to the respective use by control of the crystallization.

Crystalline phases formed in the glass-ceramic jointing material are preferably $CaSiO_3$ and/or $CaMgSi_2O_6$ and/or $MgSiO_3$ and/or $YAlO_3$.

The above-described contents of $SiO_2$ and/or CaO can prevent the crystobalite jump, in which tetragonal α-crystobalite transforms into cubic β-crystobalite, from occurring in the curve of the thermal expansion.

Since the jointing material of the invention is at least very largely free of BaO and SrO, $SrSi_2O_5$ and/or $SrSiO_3$ and/or $Sr_2SiO_4$ and/or $Sr_2Si_3O_8$ and/or $Sr_2MgSi_2O_7$ are likewise not formed as crystal phases. Formation of tridymite can likewise be avoided by means of the CaO contents according to the invention.

In the case of the glass-ceramic embodiment, the composition of the jointing material of the invention is preferably set so that it crystallizes slowly. If it were to crystallize very strongly, sufficient wetting of the components to be joined would often not be ensured. In particular, the jointing material should generally be introduced in vitreous form into the place of the join during production of a joint connection, since the temperature required for wetting of the components to be fused is then generally lower.

The spherical temperature of a jointing material according to the invention is preferably at least 850° C. It is particularly preferably at least 870° C. This corresponds approximately to the joining temperature. It is assumed that an operating temperature which is about 50° C. below the joining temperature is made possible, for the long term and reliably, by the jointing material of the invention, as a result of which the long-term operating temperature of a component joined thereby can be 800° C. and more. If the glass-ceramic variant of the jointing material is selected, the jointing materials can be subjected without problems to temperatures up to the joining temperature. The crystallization temperature should be at least 20° C. above, preferably 40° C. above, the actual joining temperature in order to have a sufficiently wide processing window for the jointing material.

The jointing material of the invention is generally produced by melting the constituents in a conventional glass melt known to those skilled in the art so as to form a glass and subsequently milling this to give a glass powder. The glass powder can, for example, be introduced into the joint connection in, for example, the form of a dispensable paste or a pre-sintered shaped body.

The jointing material of the invention can, as a preferred use, be milled after its production and be used as filler in other materials, in particular in other jointing materials or glasses.

A particular advantage of the invention is that the jointing material makes do without additional nucleating agent and/or additives which bring about crystallization of the jointing material. This makes rapid processing of the material possible. During sintering at 850° C. for 2 hours, the jointing material from example No. 1 crystallizes virtually completely, so that no changes in $\alpha_{(20-750)}$ occur even in the case of relatively long hold times. Further advantages of the jointing materials are the good and stable insulation properties of the jointing materials at the operating temperatures of a fuel cell.

The inventive vitreous or glass-ceramic jointing material makes it possible to produce joint connections which contain the jointing material of the invention. Jointing connections between at least two metal components, in particular components composed of chromium-containing steels and/or chromium alloys, in which the at least two metal components are joined by means of the jointing material of the invention can preferably be produced in this way. Likewise possible and preferred are joint connections between at least two ceramic components, in particular components composed of $Al_2O_3$ and/or scandium-stabilized zirconium oxide (ScSZ), in which the at least two ceramic components are joined by means of the jointing material of the invention. Also possible and preferred are joint connections between at least one metal component and a ceramic component, in particular components composed of the abovementioned materials in this case, in which the at least one metal component and the at least one ceramic component are joined by means of the jointing material of the invention. Preference is given to producing stacks from the above-mentioned joint connections.

Optimal strengths of a joint connection can be achieved when the thermal expansion of the jointing material is optimally matched to the materials to be joined. Furthermore, no excessively high stresses may be formed in the material due to a change in the coefficient of thermal expansion brought about by the crystallization process. The jointing material of the invention ensures this by, inter alia, avoidance of undesirable crystal phases.

Owing to its physical properties, the jointing material of the invention is particularly suitable for producing high-temperature-resistant joint connections. For the purposes of the invention, high-temperature-resistant refers to a temperature range above 800° C. It is particularly suitable for producing a gastight, high-temperature-stable, electrically insulating joint connection between materials having a thermal expansion $\alpha_{(20-750)}$ in the range from $7 \cdot 10^{-6}$ $K^{-1}$ to $11 \cdot 10^{-6}$ $K^{-1}$. Such materials are, for example, high-expansion steels and/or alloys such as CFY, or else oxide ceramics, in particular $ZrO_2$ and/or $Al_2O_3$.

Such joint connections in the high-temperature range can be used particularly advantageously in fuel cells, in particular SOFCs (solid oxide fuel cells). An example of use in fuel cells is the joining of individual SOFCs to form an SOFC stack. A further example is high-temperature electrolysis units (SOECs). The electrolytes of these usually have to meet particular requirements in terms of chemical resistance of the surrounding materials and thus also the jointing material.

Further fields of use are sensors in combustion apparatuses, for example automobile applications, ships' engines, power stations, aircraft and/or space flight technology. A preferred application is use of the vitreous or glass-ceramic jointing material of the invention for producing sensors and/or actuators, e.g. in the exhaust gas train and/or in the combustion chamber of energy-producing units, for example motor vehicles having internal combustion engines, gas turbines, aircraft turbines, combined heating and power stations, etc. Electrical lead-throughs, in particular in nuclear power stations, fusion, power stations, heating and power stations, solar furnaces and/or chemical reactors, etc., are likewise possible.

However, the vitreous or glass-ceramic jointing material of the invention can also be used for producing sintered bodies having a high heat resistance. Processes for producing sintered bodies are adequately known. In general, the starting material for the jointing material of the invention are mixed in powder form, mixed with a generally organic binder and pressed to give the desired shape. Instead of powders of the starting materials, a previously melted material according to the invention can also be milled and mixed with the binder. The pressed jointing material-binder body is then brought to sintering temperature, with the binder being able to burn out and the components being able to sinter together at the sintering temperature. The sintered body obtained in this way can then be brought into contact with the components to be joined and join these and/or be joined to these by means of a soldering process.

The use of sintered bodies for soldering has the advantage that the sintered body is a shaped component and can be brought to virtually any desired geometries. An example of a frequently used shape is a hollow cylinder which can be introduced together with an electric contact pin into openings for lead-throughs in metal components in order to obtain, as a result of soldering, a preferably hermetically sealed glass/metal lead-through or glass-ceramic/metal lead-through with an electrically insulated contact pin. Such lead-throughs are used in many electrical components and are known to those skilled in the art.

A further preferred application of the vitreous or glass-ceramic jointing material of the invention is the production of sheets comprising the jointing material. Such sheets are similar to the above-described sintered body but can be made quite flexible. Shapes can be stamped from them and used advantageously in order to join sheet-like components to one another.

EXAMPLES

The invention is illustrated herein below with the aid of the properties of jointing materials according to the invention.

The composition of illustrative jointing materials according to the invention and their physical properties are summarized in Table 1. The proportions of the components are reported in mol % on an oxide basis.

The vitreous, i.e. amorphous, jointing materials can also be the starting material for the glass-ceramic, i.e. at least partially crystalline, jointing materials according to the invention. The crystallization can be achieved, in particular, by suitable process conditions during soldering. These processes are adequately known to those skilled in the art. In Table 1, the symbols have the following meanings:

$\alpha_{(20-750)}$ linear coefficient of thermal expansion from 20° C. to 750° C.

$\alpha_{(20-300)}$ linear coefficient of thermal expansion from 20° C. to 300° C.

$T_{sintering}$ sintering temperature $T_{softening}$ softening temperature $T_{spherical}$ spherical temperature Tx peak crystallization temperature To produce the examples, the starting material is firstly melted in a glass melt. The generally pulverulent vitreous jointing material is subsequently produced therefrom by means of a milling process. In the present examples, a powder having a particle size distribution having a D(50) of about 10 µm and a D(99) of <63 µm was provided from the melted jointing materials.

The jointing materials are subsequently thermally characterized by means of a hot-stage microscope. For this purpose, a cylindrical test specimen is pressed from the jointing material in powder form to be characterized and heated on a ceramic base plate at 10 K per minute. The shape changes in the test specimen are observed; a specimen that does not crystallize generally gives, with increasing temperature, the following characteristic points to which particular viscosities can be assigned. The spherical temperature can be determined in this way.

All examples in the table are free of BaO and free of SrO. Example No. 3 has a comparatively low thermal expansion compared to Examples No. 1, 2 and 4, especially in the low temperature range. It also does not display a value for $T_K$ because it was an amorphous glass. Owing to its high $SiO_2$ content, this jointing material in particular is more amorphous than the other examples and it also has the greatest adhesion to the CFY material frequently used for fuel cells.

Examples No. 1, No. 2 and No. 4 form wollastonite (CaSiO$_3$), diopside (CaMgSi$_2$O$_6$), clinoenstatite (MgSiO$_3$) and yttrium aluminate (YAlO$_3$) as crystal phases.

All examples display values of $T_{spherical}$ significantly above 800° C. The components are usually joined by means of the jointing material of the invention as $T_{spherical}$, so that $T_{spherical}$ corresponds very largely to the joining temperature.

In the vitreous variant, joint connections using the jointing materials according to the invention can withstand temperatures up to close to the joining temperature over the long term. If at least partially crystallizing, i.e. glass-ceramic, variants of the jointing materials of the invention are used, crystallization preferably occurs during the joining operation. The at least partially crystallized jointing material then has a higher melting temperature, which in the case of complete crystallization corresponds to the melting point of the main crystal phase, than the jointing material that does not crystallize. Due to this temperature increase, components joined by means of the glass-ceramic variant of the jointing materials of the invention can be subjected to higher temperatures than those necessary in their production. As a result, some components can be produced for the first time.

In the table showing the examples, particularly large increases when comparing $T_{spherical}$ and $T_x$ can be seen in the case of Examples No. 1 and No. 2. The significantly higher $Al_2O_3$ content in Example 2 leads to crystallization at higher temperatures. A further main effect is an increase in $T_g$. An increase in the proportions of $B_2O_3$, on the other hand, brings about a decrease in $T_g$. CaO has the greatest influence on the coefficient of thermal expansion. An increase in the amount of CaO leads to an increase in the coefficient of thermal expansion.

The values achieved for the thermal expansion $\alpha_{(20-750)}$ advantageously make it possible for the jointing materials of the invention to be able to be used for producing a gastight high-temperature-stable, electrically insulating join having a thermal expansion of $7 \cdot 10^{-6}$ K$^{-1}$ upwards and preferably up to about $11 \cdot 10^{-6}$ K$^{-1}$ between materials. Such materials are, for example, high-expansion steels, alloys having a high chromium content and also oxide ceramics, in particular $ZrO_2$ and $Al_2O_3$. In particular, joint connections of $ZrO_2$ with $ZrO_2$ and also $ZrO_2$ and other materials having a high thermal expansion and also high-expansion steels and alloys can be achieved.

This and the joining temperature and/or peak crystallization temperature achieved also make use in SOFCs and SOECs possible. A further advantage of the jointing materials of the invention is that, owing to the omission of BaO and SrO, they are chemically compatible with materials having a high chromium content. As a result and due to the stable behaviour of their thermal expansion, they adhere very well to the materials to be joined and thus make it possible to produce a joint connection which is stable in the long term. In addition, the jointing material of the invention has very good chemical resistance towards attack by acid, alkalis and water, so that the components produced using the jointing materials of the invention can be used in chemically aggressive environments.

TABLE 1

Examples of Jointing Materials of the Invention and Their Properties

|  | No. 1 | No. 2 | No. 3 | No. 4 | No. 5 |
|---|---|---|---|---|---|
| $SiO_2$ | 38.7 | 36.4 | 48.3 | 34.0 | 35.0 |
| $B_2O_3$ | 8.9 | 4.49 | 13.9 | 5.0 | 4.5 |
| $Al_2O_3$ | 4.6 | 12.3 | 12.6 | 8.6 | 12.3 |
| CaO | 38.7 | 39.0 | 17.2 | 41.3 | 38.4 |
| MgO | 7.7 | 7.8 | 8 | 9.7 | 7.9 |
| $Cs_2O$ | — | — | — | — | — |
| $Y_2O_3$ | 1.4 | — | — | 1.4 | — |
| $ZrO_2$ | — | — | — | — | 2.0 |
| $\alpha_{(20-300)}$ [$10^{-6}$ K$^{-1}$] | 8.7 | 8.0 | 5.9 | 8.8 | 8.2 |
| $\alpha_{(20-750)}$ [$10^{-6}$ K$^{-1}$] | 9.8 | 8.8 | 8.3 | 9.6 | 9.0 |
| $T_g$ [° C.] | 666 | 695 | 663 | 694 | 714 |
| $T_{sintering}$ [° C.] | 705 | 767 | 759 | 754 | 730 |
| $T_{softening}$ [° C.] | 810 | 904 | 910 | 858 | 867 |
| $T_{spherical}$ [° C.] | 850 | 930 | 945 | 916 | 915 |
| Tx [° C.] | 944 | 980 | — | 950 | 980 |
|  | No. 6 | No. 7 | No. 8 | No. 9 | No. 10 |
| $SiO_2$ | 44.0 | 38.7 | 38.7 | 36.6 | 38.7 |
| $B_2O_3$ | 7.0 | 8.9 | 8.9 | 8.8 | 8.9 |
| $Al_2O_3$ | 1.0 | 1.6 | 1.6 | 1.6 | 1.5 |
| CaO | 22.0 | 38.7 | 36.7 | 39.1 | 43.4 |
| MgO | 22.0 | 7.7 | 6.7 | 6.6 | — |
| $Cs_2O$ | 1.0 | — | — | — | — |
| $Y_2O_3$ | 3.0 | 4.4 | 3.4 | 4.2 | 1.5 |
| $ZrO_2$ | — | — | 4.0 | — | 6.0 |
| $\alpha_{(20-300)}$ [$10^{-6}$ K$^{-1}$] | 8.0 | 8.5 | 8.0 | 8.3 | 7.6 |
| $\alpha_{(20-750)}$ [$10^{-6}$ K$^{-1}$] | n.d. | 9.5 | 9.2 | 9.2 | 8.7 |
| $T_g$ [° C.] | 679 | 684 | 690 | 684 | 695 |
| $T_{sintering}$ [° C.] | 737 | 724 | 727 | 705 | 721 |
| $T_{softening}$ [° C.] | 852 | 845 | 773 | 810 | 832 |
| $T_{spherical}$ [° C.] | 1188 | 870 | 872 | 857 | 877 |
| Tx [° C.] | n.d. | 901 | 978 | 920 | 971 |

While the invention has been illustrated and described as embodied in a jointing material, jointing connections made with the jointing material and other uses of the jointing material, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

What is claimed is:

1. A vitreous or glass-ceramic jointing material, which has a coefficient of thermal expansion $\alpha_{(20-750)}$ of $\geq 7 \cdot 10^{-6}$ K$^{-1}$ and is free of BaO and SrO except for at most impurities thereof, and comprises, in mol % on an oxide basis:

| | |
|---|---|
| $SiO_2$ | 34-60 |
| $B_2O_3$ | 4-14 |
| $Al_2O_3$ | 0-13 |
| CaO | 15-45 |
| MgO | 0-30 |
| $La_2O_3$ | 0-10 |
| $Y_2O_3$ | 0-10 |
| $TiO_2$ | 0-10 |
| $ZrO_2$ | 0-10 |
| $SnO_2$ | 0-10 |

-continued

| | |
|---|---|
| HfO$_2$ | 0-10 |
| R$_2$O$_3$ | 0-10, | wherein R$_2$O$_3$ is an oxide selected from the group consisting of Ga$_2$O$_3$, In$_2$O$_3$, Dy$_2$O$_3$ and Yb$_2$O$_3$; and
wherein said jointing material contains no P$_2$O$_5$.

2. A vitreous or glass-ceramic jointing material, which has a coefficient of thermal expansion $\alpha_{(20-750)}$ of $\geq 7\cdot 10^{-6}$ K$^{-1}$ and is free of BaO and SrO except for at most impurities thereof, and comprises in mol % on an oxide basis:

| | |
|---|---|
| SiO$_2$ | 34-50 |
| B$_2$O$_3$ | 4-14 |
| Al$_2$O$_3$ | 2-13 |
| CaO | 17-45 |
| MgO | 0-<10 |
| La$_2$O$_3$ | 0-10 |
| Y$_2$O$_3$ | 0-10 |
| TiO$_2$ | 0-10 |
| ZrO$_2$ | 0-10 |
| SnO$_2$ | 0-10 |
| HfO$_2$ | 0-10 |
| R$_2$O$_3$ | 0-10, | wherein R$_2$O$_3$ is an oxide selected from the group consisting of Ga$_2$O$_3$, In$_2$O$_3$, Dy$_2$O$_3$ and Yb$_2$O$_3$; and
wherein said jointing material contains no P$_2$O$_5$.

3. A vitreous or glass-ceramic jointing material, which has a coefficient of thermal expansion $\alpha_{(20-750)}$ of $\geq 7\cdot 10^{-6}$ K$^{-1}$ and is free of BaO and SrO except for at most impurities thereof, and comprises, in mol % on an oxide basis:

| | |
|---|---|
| SiO$_2$ | 30-60 |
| B$_2$O$_3$ | 0.1-10 |
| Al$_2$O$_3$ | 0-2 |
| CaO | 15-40 |
| MgO | 0-30 |
| La$_2$O$_3$ | 0-10 |
| Y$_2$O$_3$ | 0-10 |
| TiO$_2$ | 0-10 |
| ZrO$_2$ | 0-10 |
| SnO$_2$ | 0-10 |
| HfO$_2$ | 0-10 |
| R$_2$O$_3$ | 0-10, | wherein R$_2$O$_3$ is an oxide selected from the group consisting of Ga$_2$O$_3$, In$_2$O$_3$, Dy$_2$O$_3$ and Yb$_2$O$_3$; and
wherein said jointing material contains no P$_2$O$_5$.

4. A vitreous or glass-ceramic jointing material, which has a coefficient of thermal expansion $\alpha_{(20-750)}$ of $\geq 7\cdot 10^{-6}$ K$^{-1}$ and is free of BaO and SrO except for at most impurities thereof, and comprises, in mol % on an oxide basis:

| | |
|---|---|
| SiO$_2$ | 34-60 |
| B$_2$O$_3$ | 0.1-14 |
| Al$_2$O$_3$ | 0-13 |
| CaO | 15-45 |
| MgO | 0-30 |
| La$_2$O$_3$ | 0-10 |
| Y$_2$O$_3$ | 0-10 |
| TiO$_2$ | 0-10 |
| ZrO$_2$ | 0-10 |
| SnO$_2$ | 0-10 |
| HfO$_2$ | 0-10 |
| R$_2$O$_3$ | 0-10, | wherein R$_2$O$_3$ is an oxide selected from the group consisting of Ga$_2$O$_3$, In$_2$O$_3$, Dy$_2$O$_3$ and Yb$_2$O$_3$; and
wherein said jointing material also contains Y$_2$O$_3$ in an amount >0 mol %.

5. A vitreous or glass-ceramic jointing material, which has a coefficient of thermal expansion $\alpha_{(20-750)}$ of $\geq 7\cdot 10^{-6}$ K$^{-1}$ and is free of BaO and SrO except for at most impurities thereof, and comprises, in mol % on an oxide basis:

| | |
|---|---|
| SiO$_2$ | 34-60 |
| B$_2$O$_3$ | 0.1-14 |
| Al$_2$O$_3$ | 0-13 |
| CaO | 15-45 |
| MgO | 0-30 |
| La$_2$O$_3$ | 0-10 |
| Y$_2$O$_3$ | 0-10 |
| TiO$_2$ | 0-10 |
| ZrO$_2$ | 0-10 |
| SnO$_2$ | 0-10 |
| HfO$_2$ | 0-10 |
| R$_2$O$_3$ | 0-10, | wherein R$_2$O$_3$ is an oxide selected from the group consisting of Ga$_2$O$_3$, In$_2$O$_3$, Dy$_2$O$_3$ and Yb$_2$O$_3$;
wherein said jointing material also contains at least one alkali metal oxide selected from the group consisting of Na$_2$O, K$_2$O and Li$_2$O; and
wherein a sum total amount of said Na$_2$O+said K$_2$O+said Li$_2$O, in mol % on an oxide basis, in the jointing material is <1.

6. A vitreous or glass-ceramic jointing material, which has a coefficient of thermal expansion $\alpha_{(20-750)}$ of $\geq 7\cdot 10^{-6}$ K$^{-1}$ and is free of BaO and SrO except for at most impurities thereof, and comprises, in mol % on an oxide basis:

| | |
|---|---|
| SiO$_2$ | 34-60 |
| B$_2$O$_3$ | 0.1-14 |
| Al$_2$O$_3$ | 0-13 |
| CaO | 15-45 |
| MgO | 0-30 |
| La$_2$O$_3$ | 0-10 |
| Y$_2$O$_3$ | 0-10 |
| TiO$_2$ | 0-10 |
| ZrO$_2$ | 0-10 |
| SnO$_2$ | 0-10 |
| HfO$_2$ | 0-10 |
| R$_2$O$_3$ | 0-10, | wherein R$_2$O$_3$ is an oxide selected from the group consisting of Ga$_2$O$_3$, In$_2$O$_3$, Dy$_2$O$_3$ and Yb$_2$O$_3$;
wherein the jointing material also contains at least one alkali metal oxide selected from the group consisting of Cs$_2$O and Rb$_2$O; and
wherein a sum total amount of said Cs$_2$O+said Rb$_2$O, in mol % on an oxide basis, in the jointing material is <5.

7. The jointing material according to claim 1, having a crystalline phase, and wherein said crystalline phase comprises CaSiO$_3$ and/or CaMgSi$_2$O$_6$ and/or MgSiO$_3$ and/or YAlO$_3$.

8. A joint connection between at least two metal components;
wherein said jointing connection comprises said jointing material according claim 1 and said metal components are joined by said jointing material.

9. A joint connection between at least two metal components;
wherein said jointing connection comprises said jointing material according claim 1 and said metal components are joined by said jointing material; and
wherein said metal components are composed of chromium-containing steels and/or chromium alloys.

10. A joint connection between at least two ceramic components;
   wherein said jointing connection comprises said jointing material according claim 1 and said ceramic components are joined by said jointing material.

11. A joint connection between at least two ceramic components;
   wherein said jointing connection comprises said jointing material according claim 1 and said ceramic components are joined by said jointing material; and
   wherein said ceramic components are composed of $Al_2O_3$ and/or scandium-stabilized zirconium oxide (ScSZ).

12. A joint connection between at least one metal component and at least one ceramic component;
   wherein said jointing connection comprises said jointing material according to claim 1 and said at least one metal component and said at least one ceramic component are joined by said jointing material.

13. A joint connection between at least one metal component and at least one ceramic component;
   wherein said jointing connection comprises said jointing material according to claim 1 and said at least one metal component and said at least one ceramic component are joined by said jointing material; and
   wherein said at least one metal component is composed of a chromium-containing steel and/or a chromium alloy and said at least one ceramic components is composed of $Al_2O_3$ and/or scandium-stabilized zirconium oxide (ScSZ).

14. A joint connection in a fuel cell, in an electrolysis cell, in a sensor, or in an actuator, wherein said joint connection comprises said jointing material according to claim 1.

15. An article comprising a jointing material according to claim 1 wherein said article is a sintered body, a sintered sheet, a glass material, or a glass ceramic material.

16. A solid oxide fuel cell (SOFC) with a jointing connection, wherein said jointing connection comprises said jointing material according to claim 1.

17. A solid oxide electrolysis cell (SOEC) with a jointing connection, wherein said jointing connection comprises said jointing material according to claim 1.

* * * * *